Aug. 25, 1959 W. R. STONE 2,901,553

TELEPHONE HOLDER

Filed May 16, 1955 3 Sheets-Sheet 1

INVENTOR
William R. Stone.

BY Cameron, Kerkam & Sutton
ATTORNEYS

Aug. 25, 1959 W. R. STONE 2,901,553

TELEPHONE HOLDER

Filed May 16, 1955 3 Sheets-Sheet 2

INVENTOR

William R. Stone.

BY Cameron, Kerkam & Sutton

ATTORNEYS

Aug. 25, 1959 W. R. STONE 2,901,553

TELEPHONE HOLDER

Filed May 16, 1955 3 Sheets-Sheet 3

INVENTOR

William R. Stone.

BY Cameron, Kerkam & Sutton

ATTORNEYS

United States Patent Office 2,901,553

Patented Aug. 25, 1959

2,901,553

TELEPHONE HOLDER

William R. Stone, Mount Rainier, Md.

Application May 16, 1955, Serial No. 508,438

4 Claims. (Cl. 179—148)

This invention relates to telephone holders and more particularly to telephone holders which are adjustable in height to enable the same to be used with facility by all.

Heretofore telephone holders have been proposed which are fixed to or rest upon a desk or similar surface and these holders have been provided with various structures for adjusting both the height of the telephone and its angularity to adapt the holder for use by all. These prior art structures are either unduly complicated and expensive to construct or do not maintain their adjustment in use so that they are troublesome and awkward. The present invention overcomes the difficulties inherent in prior art structures and provides a novel and simple construction for a telephone holder which is easy to adjust and which retains its adjusted position without complicated and expensive structure.

It is accordingly an object of the present invention to provide a novel telephone holder which is relatively cheap and easy to manufacture, which is of simple construction, which maintains its adjusted position, and which is simple and easy to use.

The telephone holders of the present invention are capable of various mechanical embodiments, three of which are shown in the accompanying drawings and are described hereinafter to illustrate the same. These illustrative embodiments of the present invention should in no way be construed as defining or limiting the same and reference should therefore be had to the appended claims to determine the scope of this invention.

Referring now to the drawings, in which like reference characters indicate like parts, Fig. 1 is a perspective view of an embodiment of the telephone holder of the present invention in exploded position with the holder mounted at the left front edge of a suitable surface;

Fig. 1*a* is a view of the embodiment of Fig. 1 with the holder mounted at the left rear of a suitable surface;

Figures 1, 1A, 2, 3, 4:
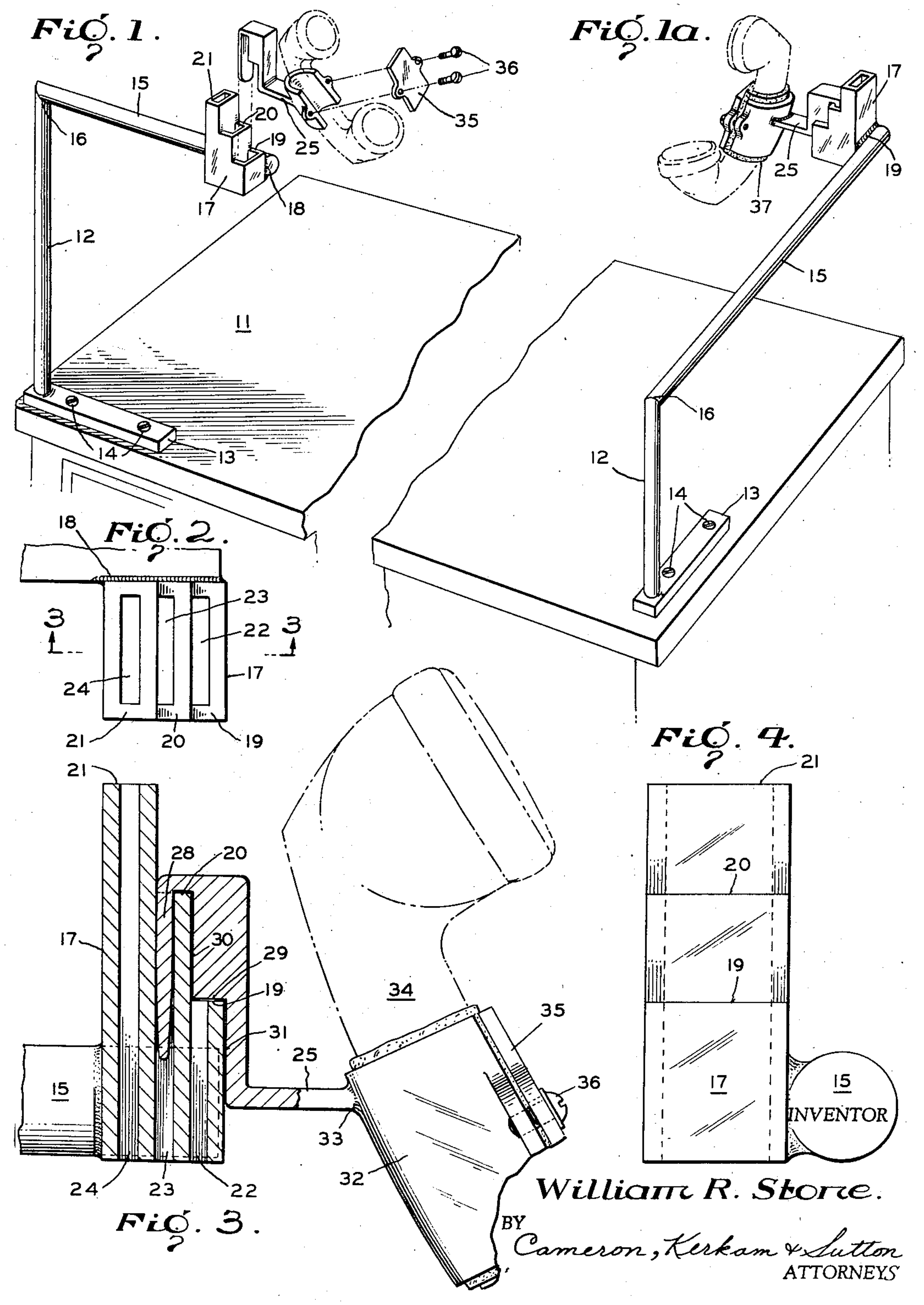
Fig. 2 is a view from above of the stepped socket of Figs. 1 and 1*a*.
Fig. 3 is a vertical cross-sectional view of the stepped socket and receiver support arm of the embodiment of Fig. 1.
Fig. 4 is a front elevation of the stepped socket of the embodiment of Fig. 1.

Referring now more particularly to Figs. 1–4 a suitable surface such as a desk or a table top is generally indicated at 11 and a vertical member 12 is suitably secured thereto by being provided with a foot 13 which is secured to surface 11 by screws or bolts 14. A horizontal member 15 is suitably secured to the top of vertical member 12 as by welding at 16. Horizontal member 15 can, of course, be formed integrally with vertical member 12 and bent at a right angle at 16 or the structure may be cast in a unitary piece, as may be most convenient. A stepped socket 17 is suitably secured to horizontal member 15 as by welding at 18.

Stepped socket 17 includes a plurality of steps here shown as three steps 19, 20 and 21, each step including a vertically disposed aperture therein at 22, 23 and 24, respectively, socket 17 being preferably formed as a unitary member. It is understood, of course, that socket 17 may be made up or formed in any manner which is best suited for the purpose.

A receiver support arm 25 is employed with holder 17. Arm 25 includes a downwardly extending tongue 28 for engagement in one of apertures 22, 23 or 24; a shoulder 29 which engages one of the steps 19 or 20 when tongue 28 is in apertures 23 or 24, respectively. Arm 25 also includes vertically disposed surfaces 30 and 31 which engage the risers of steps 19 and 20 when tongue 28 is engaged in apertures 23 and which engage the risers of steps 20 and 21 when tongue 28 is in aperture 24. By this construction an adjustable construction is provided which holds the telephone in desired position without possibility of accidental change of adjustment.

Arm 25 includes a bracket 32 which is suitably secured thereto as by welding at 33. Bracket 32 is angularly disposed with respect to arm 25 so that the long axis of the telephone 34 mounted in bracket 32 is at an angle of approximately 28°–30° from the vertical with the mouthpiece of telephone 34 positioned at this angle away from the user and at this angle to the right of the ear piece. Telephone 34 is held in bracket 32 by cover plate 35 and screws 36, a gasket 37 being used, if desired, between telephone 34 and the bracket assembly.

Figure 5:
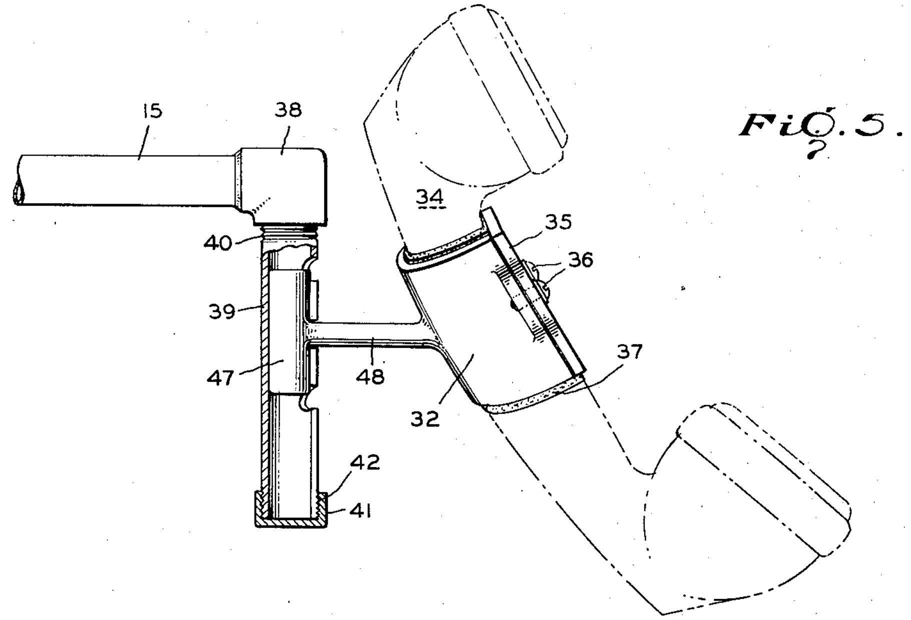
Fig. 5 is a side elevation partly in section showing another embodiment of the holder of the present invention.
Figure 6:
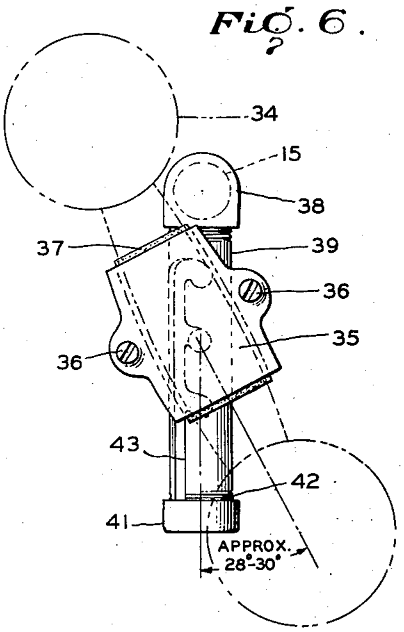
Fig. 6 is a front elevation of the embodiment of Fig. 5.
Figure 7:
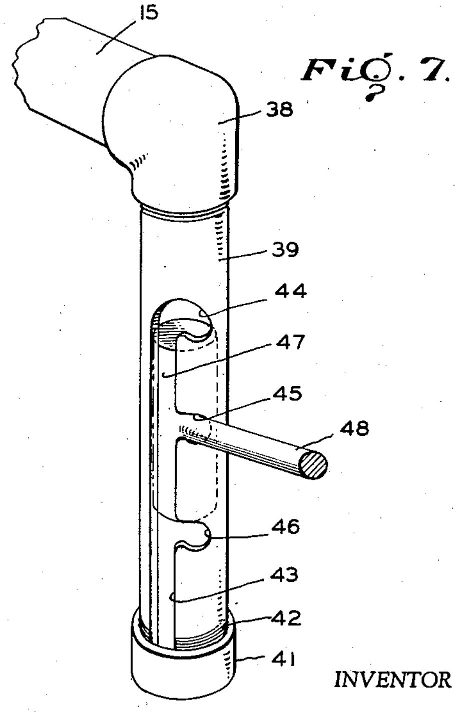
Fig. 7 is an enlarged view of a part of the embodiment of Fig. 5.

In the embodiment of Figs. 5–7 member 15 terminates in a right angled elbow 38 in which a downwardly extending hollow cylindrical member 39 is threaded as at 40. Member 39 is closed by a lower cap 41 which is suitably mounted thereon as by threads 42 and is provided with a vertically extending slot 43 which extends through the lower end thereof. Slot 43 is provided with a plurality of offsets here shown as three offsets 44, 45 and 46. A cylindrical traveler 47 is mounted within hollow member 39 for vertical movement therein. Traveler 47 includes an outwardly extending arm 48 which moves in slot 43 for rotation into offsets 44, 45 or 46 as may be desired. Arm 48 carries bracket 32 to hold telephone 34. Telephone 34 is held in bracket 32 by plate 35 and screws 36 with a gasket 37 interposed when necessary. As will be seen in Figs. 5 and 6, bracket 32 is positioned with respect to arm 48 so that the long axis of the telephone 34 is disposed at an approximate 28°–30° angle from the vertical as described to accommodate the natural position of the head of the user of the telephone.

Figure 8:
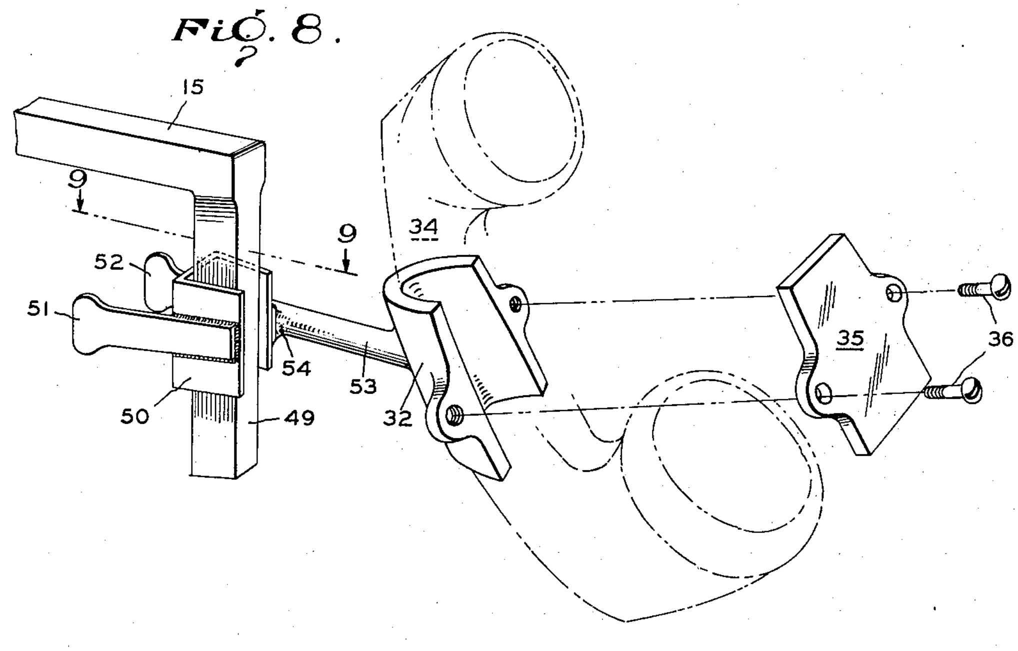
Fig. 8 is a perspective view of another embodiment of the holder of the present invention.
Figure 9:
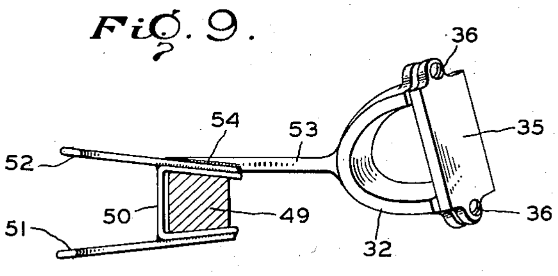
Fig. 9 is a view partly in section of the embodiment of Fig. 8 on the line 9—9 thereof.
Figure 10:
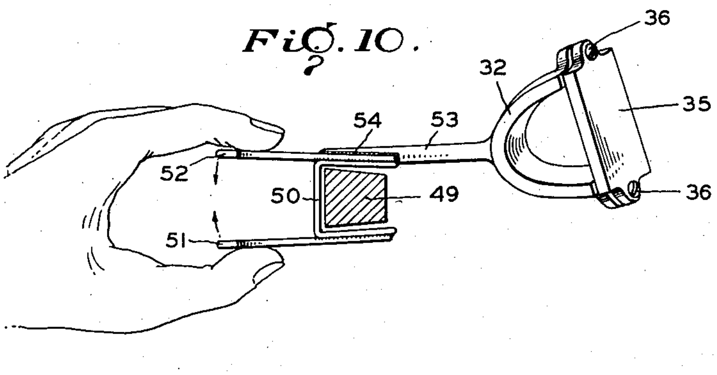
Fig. 10 is a view similar to that of Fig. 9 showing the embodiment thereof in released position for vertical adjustment of the holder.

In the embodiment of Figs. 8–10 arm 15 terminates in a downwardly extending member 49 which is of truncated triangular shape in cross section, as seen in Figs. 9 and 10. A spring clamp 50 engages member 49 and is provided with manually engageable wing members 51 and 52 to release clamp 50 from member 49 as shown in Fig. 10. An arm 53 is suitably secured to clamp 50 at 54 and bracket 32 is mounted thereon so that the long axis of telephone 34 is arranged at an approximate 28°–30° angle from the vertical as described above.

Telephone 34 is held in bracket 32 by plate 35 and screws 36.

The use and operation of the novel telephone holder of the present invention should now be apparent from the description above of the illustrative embodiments thereof. In the embodiment of Figs. 1–4, vertical adjustment of telephone 34 to the requirements of the user, may be effected by inserting tongue 28 into any one of apertures 22, 23 or 24 to get the desired height. In the embodiment of Figs. 5–7 vertical adjustment for height is obtained by placing arm 48 in any one of the offsets 44, 45 or 46. In the embodiment of Figs. 8–10 vertical adjustment for height is obtained by moving spring member 50 along the downwardly extending member 49.

It should now be apparent to those skilled in the art that the present invention in every way satisfies the several objects described above.

Changes in or modifications to the above described illustrative embodiments of the present invention may now be suggested to those skilled in this art without departing from the inventive concept hereof. Reference should therefore be had to the appended claims to determine the scope of the present invention.

What is claimed is:

1. In a telephone holder, vertical supporting means having a foot for attachment to a desk-like supporting surface, an arm rigidly connected with said means and extending laterally therefrom at an elevation above said foot, a bracket for holding a telephone instrument in position for use by a person using said surface, said bracket constructed and arranged to hold said instrument with its long axis at an angle to the vertical in planes at right angles to one another with its mouthpiece at the bottom and away from the user and its receiver at the top and to one side of said mouthpiece, and cooperating supporting members interlocking detachably with each other at each of a plurality of vertically spaced positions, said members being thus capable of adjustment relative to each other stepwise in a vertical direction and one of said members being rigidly connected with said bracket and the other rigidly connected with said arm.

2. A telephone holder as defined in claim 1, one of said members comprising a socket member having a plurality of vertically spaced horizontal offsets, each offset having means for interlocking with said other member independently of the other offsets, the other member being detachable from each interlocking means for vertical movement relative to said socket member and engagement with the interlocking means at one of the other offsets to provide relative adjustment of said members between said vertically spaced positions.

3. A telephone holder as defined in claim 2, each of said vertically spaced horizontal offsets having a downwardly opening aperture therein, said other member having a downwardly turned supporting arm adapted to enter any one of said apertures.

4. In a telephone holder, vertical supporting means having a foot for attachment to a support, an arm extending laterally from said supporting means, a socket member carried by said arm and having a series of vertically spaced horizontal surfaces connected by vertical walls in stepped back relation, said member having a plurality of similar vertical slots one opening in each of said horizontal surfaces, and a telephone instrument holder having a tongue-like connecting member shaped to fit in any one of said slots, said holder having a surface substantially parallel to said tongue and spaced therefrom by a distance substantially equal to the thickness of said vertical walls of the socket member.

References Cited in the file of this patent

UNITED STATES PATENTS 2,602,863 Raymond et al. ........... July 8, 1952
2,696,528 Chesick ................. Dec. 7, 1954
2,723,818 Hurtzig ................. Nov. 15, 1955

UNITED STATES PATENT OFFICE

CERTIFICATE OF CORRECTION

August 25, 1959

Patent No. 2,901,553

William R. Stone

It is hereby certified that error appears in the above numbered patent requiring correction and that the said Letters Patent should read as corrected below.

In the grant, line 3, address of inventor, for "Mount Rainier, Maryland," read -- Washington, District of Columbia, --; in the heading to the printed specification, line 3, for "Mount Rainier, Md." read -- Washington, D. C. --.

Signed and sealed this 5th day of April 1960.

(SEAL)
Attest:

KARL H. AXLINE
Attesting Officer

ROBERT C. WATSON
Commissioner of Patents